United States Patent [19]

Bean

[11] Patent Number: 5,440,975
[45] Date of Patent: Aug. 15, 1995

[54] FOOD TEMPERATURE MAINTENANCE

[76] Inventor: Douglas C. Bean, 84 Lewis Rd., Wantirna South, Victoria 3152, Australia

[21] Appl. No.: 290,989
[22] PCT Filed: Feb. 23, 1993
[86] PCT No.: PCT/AU93/00077
§ 371 Date: Aug. 23, 1994
§ 102(e) Date: Aug. 23, 1994
[87] PCT Pub. No.: WO93/16627
PCT Pub. Date: Sep. 2, 1993

[30] Foreign Application Priority Data

Feb. 25, 1992 [AU] Australia ............... PL1088

[51] Int. Cl.⁶ .......................................... A47J 39/02
[52] U.S. Cl. ............................. 99/483; 99/467; 126/246; 126/375; 206/545; 220/23.8; 220/556
[58] Field of Search ......... 99/467, 483, 426, DIG. 14; 126/375, 246, 400, 261; 206/557, 545, 562, 564, 541, 547; 220/23.8, 23.86, 556, 4.23, 626, 427, 428, 771, 902, 4.21; 165/47, 73, 186

[56] References Cited

U.S. PATENT DOCUMENTS

| | | |
|---|---|---|
| 3,429,369 | 2/1969 | Segal . |
| 3,613,872 | 10/1971 | Donnelly .................... 220/902 |
| 3,784,787 | 1/1974 | Shevlin .................... 99/359 |
| 3,799,386 | 3/1974 | Madalin et al. .................... 220/23.8 |
| 3,875,370 | 4/1975 | Williams .................... 126/246 |
| 3,938,688 | 2/1976 | Ryan .................... 206/545 |
| 4,225,052 | 9/1980 | Tector et al. .................... 220/506 |
| 4,373,511 | 2/1983 | Miles et al. .................... 99/467 |
| 4,880,951 | 11/1989 | Levinson .................... 99/DIG. 14 |
| 4,917,076 | 4/1990 | Nadolph .................... 126/375 |
| 4,982,722 | 1/1991 | Wyatt .................... 126/246 |
| 5,116,240 | 5/1992 | Wischhusen et al. .................... 206/545 |

FOREIGN PATENT DOCUMENTS

| | | |
|---|---|---|
| 20955 | 11/1983 | Australia . |
| 0002563 | 6/1979 | European Pat. Off. . |
| 2447174 | 9/1980 | France . |
| 3639415 | 6/1988 | Germany . |

*Primary Examiner*—Timothy F. Simone
*Attorney, Agent, or Firm*—Frank D. Gilliam; John R. Duncan; Donn K. Harms

[57] ABSTRACT

An insulated food storage system comprising a heat insulating base and a heat insulating cover together defining a cavity. A thermal plate fits within the cavity, the thermal plate having a chamber containing wax which solidifies in the temperature range 75° C. to 95° C. So that food located within the cavity together with the thermal plate is maintained substantially within that temperature range as the wax which has been previously heated and liquefied cools and solidifies. The wax in one embodiment is in a metal tray closed by a metal lid within the chamber in the thermal plate. The chamber is in a central region of the thermal plate and the edges have no wax within the space between the top and the bottom walls of the edges. A plastics material with very low thermal conductivity is used for the thermal plate.

22 Claims, 1 Drawing Sheet

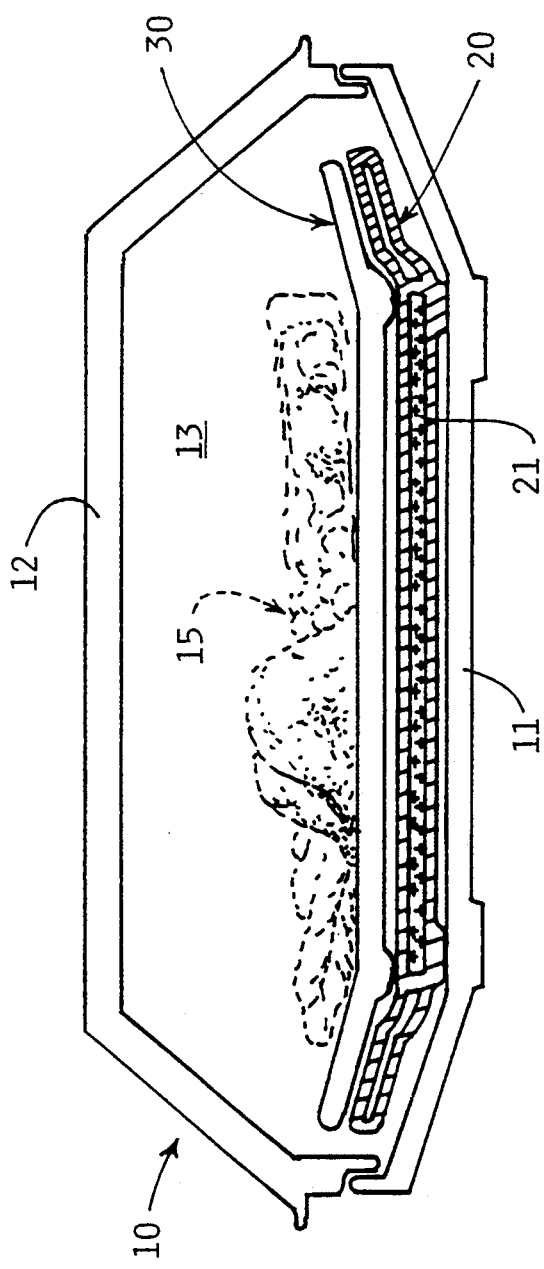
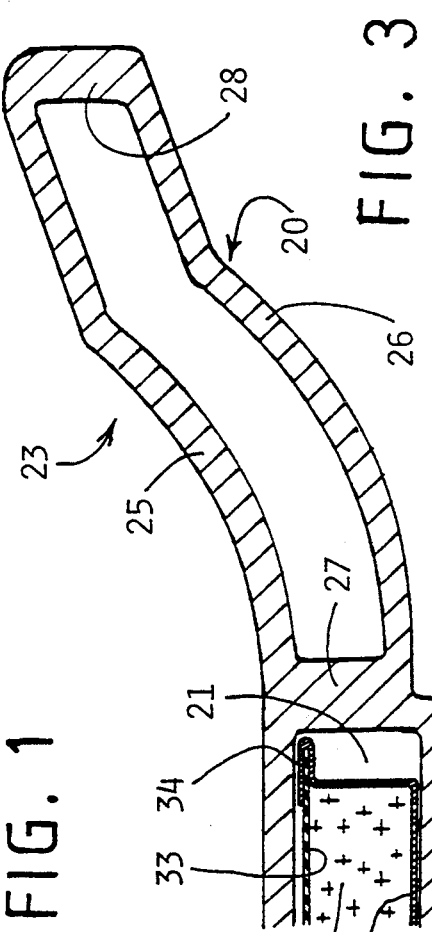
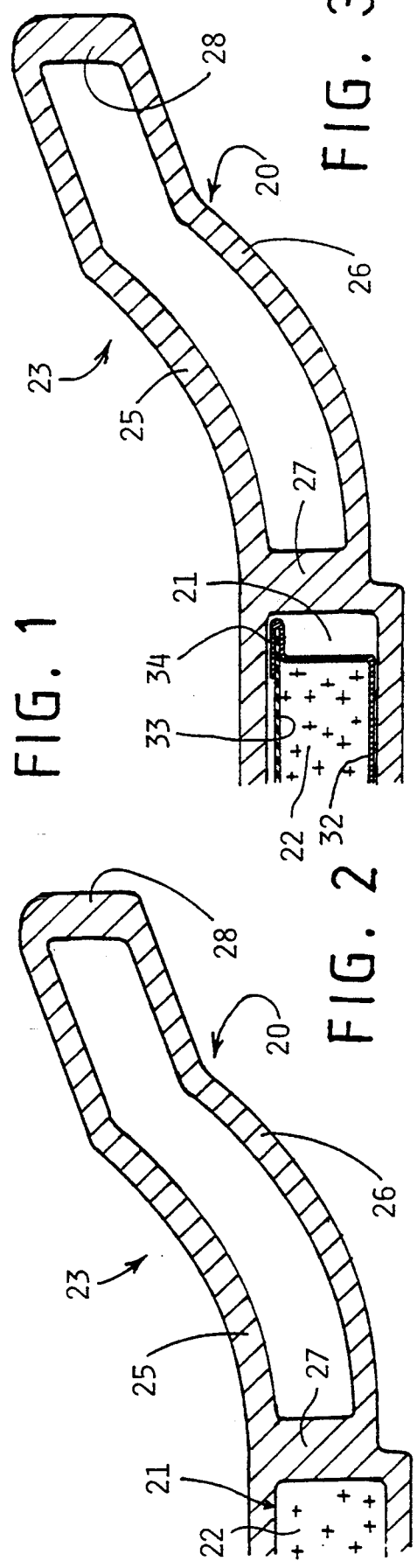
FIG. 1
FIG. 2
FIG. 3

FOOD TEMPERATURE MAINTENANCE

This application claims priority from PCT/US93/00077 filed on Feb. 23, 1993.

BACKGROUND OF THE INVENTION

1. Field of the Invention

This invention relates to maintaining temperature of cooked food e.g. in hospitals, nursing homes and the like so that food is kept above food infection temperatures while it is being transported from a preparation area to the consumer such as a patient.

2. Description of the Prior Art

Various systems are known for attempting to maintain heated food prepared at a remote location at a suitable temperature for serving. For example, it is known to preheat the food plates so that the stored heat in the plate maintains the food placed thereon at an elevated temperature for a longer time. It is also known to cover a plate on which food has been placed with a cover member so as to reduce the rate of heat loss.

It is also known to provide an insulating cover and co-operating base both made of a heat insulating material so that a food plate with food thereon can be placed on the base and the cover placed over the plate so as to rest on the perimeter of the base. The base and cover in combination define a closed insulating vessel for the plate and the food thereon.

It is also known to provide an additional auxiliary heat storing member, known as a "thermal plate", which is preheated and placed on the insulating base so that the food plate rests on top of the thermal plate. The insulating cover is then placed over the top. The thermal plate in use is heated to an elevated temperature, e.g. about 120° C., so that the thermal plate holds considerable heat when the food plate with the food thereon is initially placed on the thermal plate and within the enclosure defined by the cover and the base.

There are shortcomings with all of the systems of maintaining food hot that are outlined above. The simpler systems are of limited effectiveness. The closed vessel defined by the insulating cover and base, together with the pre-heated thermal plate and pre-heated food plate, also suffers from some shortcomings. For example, with all of the systems outlined, the temperature of the food plate and the food thereon will continuously decrease towards ambient temperature. This in turn means that the food and the food plate can be too hot if served quickly after preparation. At extreme times, the food plate will cool to a temperature below 70° C. and there is a significant risk of fast contamination of the food product.

SUMMARY OF THE INVENTION

By way of example, tests were conducted with a cover and base made of plastics material and in which an 800 gm aluminium thermal plate was located. The thermal plate was pre-heated to 120° C. and was allowed to cool within the enclosure to 70° C. This thermal plate provides about 8000 calories of heat in cooling through 50° C. The typical heat loss of, say, 3.5 calories per second yielded a time of about forty minutes before the thermal plate and hence the supported food plate and food thereon cooled to 70° C. Thus, with this system, food can be prepared up to forty minutes before being served at about 70° C. or more.

It is an object of the present invention to provide an insulated food storage system which can enable food to be stored and carried above food infection temperatures for substantial periods of time.

It is an object of a second aspect of the invention to provide a thermal plate which can be used in an insulated food storage system and which enables food to be stored at temperatures above food infection temperatures for substantial periods of time.

According to the present invention there is provided an insulated food storage system comprising a thermally insulating enclosure comprising a heat insulating base and a heat insulating cover, the base and the cover cooperating together so as to define a cavity, the system further including a heat storage insert to fit within the cavity, the heat storage insert having a chamber therein and a liquefiable substance located within the chamber, the substance having the property of being liquefiable by heating and of solidifying at a temperature or at temperatures within a predetermined temperature range, the temperature or temperatures being at or above food spoilage temperatures and at an acceptable temperature for consumption of hot food, whereby food located within the cavity together with the heat storage insert is maintained substantially at said temperature or at temperatures within said range as the liquefiable substance which has been previously heated and liquefied cools and solidifies.

Preferably the substance solidifies at a temperature less than 95° C., e.g. at a temperature or at temperatures within the range 65° C. to 95° C. A suitable substance has been found to be one which solidifies at a temperature or at temperatures within the range 75° C. to 95° C.

The liquefiable substance preferably comprises a wax product such as a hard paraffin.

The insert may be in the form of and may have the function of a thermal plate, the chamber within the heat storage insert and containing the liquefiable substance being located centrally of the surface area of the thermal plate, the thermal plate including an edge region which does not contain the liquefiable substance enabling the edge region to be manually handled without insulating gloves being worn.

The edge region is preferably an annular region around the periphery of the thermal plate. The edge region for example may be a hollow region.

The thermal plate may comprise an upper face and a lower face which are spaced apart and further may comprise a partition defining a perimeter of the chamber within which the liquefiable substance is contained. The thermal plate may be in the general form of a circular disc, the upper and lower faces being joined together at the edges of the disc, the partitions being located around the general centre of the circular disc and spaced inwardly from the peripheral edges of the circular disc so as to define a circular chamber containing the liquefiable substance at the general central region of the circular disc and an annular edge region where the upper and lower faces are spaced apart, none of the liquefiable substance being contained in the edge region. The thermal plate is preferably generally complementary in shape to the under surface of a food plate so that the food plate rests on the thermal plate, the chamber containing the liquefiable substance being generally equal in area to the area of the central part of the food plate on which food is in use placed and located directly beneath the central area of the food plate.

Preferably the heat storage insert includes a container in which the liquefiable substance is located, the container being located within the chamber in the heat storage insert. The container is made of a dissimilar material to the composition of the liquefiable substance. Preferably the container is made of metal and the liquefiable substance is a wax, and the liquefiable substance fills the metal container. The metal container may comprise a tray, the liquefiable substance being received in solid phase with a close fit within the tray, and a metal lid covering both the tray and the liquefiable substance therein, the metal lid having peripheral edges sealed to the peripheral edges of the tray. The liquefiable substance may be initially cast in a liquid state in a mould which is slightly larger in dimensions to the tray, the liquefiable substance upon solidifying in the mould shrinking to a size so that, upon being removed from the mould in the solid state and being placed in the tray, the solidified substance forms a close fit within the tray.

In one possible use of the system, the heat insulating base is in the general form of a drum into which a number of heat storage inserts can be stacked, the heat insulating cover comprising a lid for the drum, whereby the enclosure formed by the drum and the lid can contain a stack sequentially composed of a heat storage insert, a food plate having food thereon, and a spacer for supporting a superimposed heat storage insert without contacting food on the food plate, the stack further comprising a number of similar sequentially arranged inserts, food plates, and spacers throughout the height of the drum.

The heat storage insert is preferably composed of a low heat conductivity plastics material so as to reduce heat loss through the insert as the liquefiable substance solidifies and consequently promote formation in the liquefiable substance of a solid phase having a lower energy state than if rapidly solidified. The heat storage insert is composed of polypropylene.

According to a second aspect of the invention there is provided a heat storage insert for use in an insulated food storage system as described, the heat storage insert having its chamber containing the liquefiable substance located centrally within the insert and having at least one portion of its peripheral edge without having liquefiable substance located therein.

Possible and preferred features of the present invention will now be described with particular reference to the accompanying drawings. However it is to be understood that the features illustrated in and described with reference to the drawings are not to be construed as limiting on the scope of the invention. In the drawings:

BRIEF DESCRIPTION OF THE DRAWING FIGURES

FIG. 1 is a side sectional view of an insulated food storage system according to the invention, FIG. 2 is a magnified cross sectional view of the edge region of a thermal plate according to the invention, and FIG. 3 is a view similar to FIG. 2 and showing an alternative construction of a thermal plate.

DESCRIPTION OF THE PREFERRED EMBODIMENTS

The insulated food storage system in the drawings comprises a thermally insulating enclosure 10 comprising a heat insulating base 11 and a heat insulating cover 12 which co-operate together to define a cavity 13. A heat storage insert 20 fits within the cavity 13. The insert 20 bas a chamber 21 therein in which there is provided a liquefiable substance 22, having the property of solidifying at a temperature or at temperatures within a predetermined temperature range so as to keep food 15 within the cavity 13 at a temperature above food infection temperatures and at an acceptable temperature for consumption.

The heat storage insert 20 is shown in the general form of a circular plate and my be used in the manner of a "thermal plate". It will be convenient to describe the construction and operation of the heat storage insert 20 by referring to it as "thermal plate 20" but other configurations of the insert are possible.

The liquefiable substance 22 provided within the chamber 21 in the thermal plate 20 preferably solidifies at a temperature above accepted food infection temperatures, and below 100° C. and most preferably at or below about 95° C. Maintaining temperatures above food infection temperatures in an insulated food storage enclosure and above about 95° C. has been found to cause significant degrading of the food. Also significant additional and undesirable cooking of the food can take place. Preferably the liquefiable substance solidifies as it cools from elevated temperatures at a temperature or range of temperatures preferably within the broader temperature range 65° C. to 95° C. Although below about 70° C. is in the temperature range for activity of food degrading micro-organisms, such temperatures can be acceptable for some food products, e.g. for maintaining toast warm. The liquefiable substance is preferably a wax product such as "hard paraffin" having a solidifying temperature in the range 75° C. to 95° C., although wax products having other solidifying temperatures, e.g. in the range 70° C. to 90° C. may be suitable.

The thermal plate 20 has the chamber 21 containing the liquefiable substance 22 located generally radially centrally of its surface area, leaving an edge region 23 which is annular in shape without liquefiable substance 22 therein. This can enable the edge region 23 to be touched and held by the user without needing gloves.

In the illustrated embodiments, the thermal plate 20 is composed of an upper face 25 and a lower face 26, which are spaced apart. Partition 27 defines the perimeter of chamber 21 within which the liquefiable substance 22 is contained. The thermal plate 20 is in the general form of a circular disc with the upper and lower faces 25, 26 being joined together at the edges 28 of the disc and also being spaced apart by circular partition 27 located around the centre of the thermal plate and spaced therefrom so as to define circular chamber 21 at the central region of the thermal plate 20.

An advantage of the provision of solid partition 27 extending around the central chamber 21 is that large numbers of such thermal plates 20 can be stacked on top of each other, or with interleaved food plates for simultaneous heating of the food plates and thermal plates, so that each plate is supported by the solid partitions 27 of the plates stacked below.

The heat storage insert 20 may have food placed directly thereon so that the food will be maintained at a raised temperature by the pre-heated thermal plate. However preferably, the thermal plate 20 is used as a support for a food plate 30 within the insulating base 11 and cover 12 defining the enclosure. The chamber 21 containing the liquefiable substance 22 is located centrally within the cavity 13 and is directly beneath the general central region of the food plate 30.

The partition 27 which defines the perimeter of the chamber 21 can be formed by complementary formations (not shown) on the under surface of the upper face 25 and on the upper surface of the lower face 26. These complementary formations, and similar formations at the outside perimeter 28 of the plate, are designed to enable the upper and lower faces 25, 26 to be secured together and the chamber 21 sealed. The upper and lower faces 25, 26 may be secured together at the complementary formations thereof by means of a suitable adhesive or by means of fusing the materials together. For example, the upper and lower faces 25, 26 may be welded together by using heat to fuse the faces together. This will create the solid partition 27 around the chamber 21.

The material of the insert 20 is preferably a plastics having a particularly low heat conductivity, e.g. polypropylene. This slows the rate of heat loss during solidification of the wax 22, hence promoting formation of a lower energy solid state than achieved by rapid cooling. Greater heat yield is found for slower cooling.

FIG. 2 shows the liquefiable substance 22, preferably a wax, filling the chamber 21. However to avoid the possibility of leaching or migration of the wax through the material of the upper and lower faces 25, 26, there may be provided as shown is FIG. 3 an additional container for the wax, made of a dissimilar material to the wax, the container being located in the chamber 21. The dissimilar material is preferably not a polymer since wax can migrate through polymers.

In FIG. 3 the chamber 21 contains a metal container 31 comprising a metal tray 32 containing the wax 22 which in the solid phase is a close fit therein, and a metal lid 33 sealed around its periphery to the edge of the tray 32, e.g. by crimping at 34 with a sealing composition incorporated in the crimped edges. Because wax shrinks when it solidifies, the wax 22 is desirably cast in a mould of slightly larger size than the tray 32 so that when the wax solidifies it fits closely in the tray 32 preparatory to locating the lid 33 in position and sealing the edges 34. A suitable metal for the tray 32 and lid 33 is heavy alumimium foil which can be pressed to form the tray. The sealing at the edges 34 may be achieved by incorporating an adhesive or heat sealing or heat weldable material (which softens at a temperature above any working temperatures for the thermal plate) in the regin where the tray edge is rolled over and crimped to the edge of the lid.

In use of the thermal plate 20 and the food storage system particularly described and illustrated, the thermal plate can be heated to a temperature of, say, 95° C. or slightly above that temperature at which temperature the wax 22 within the chamber 21 in the thermal plate will be liquefied. A pre-heated food plate 30 with food 15 thereon can be placed on the thermal plate 20 and both the thermal plate 20 and food plate 30 are located within the cavity 13 formed by the insulating base 11 and the insulating cover 12. The insulating base and cover 11, 12 meet at their circumferential edges so that the cavity 13 is effectively sealed against heat loss except through the thickness of material of the base and cover.

As the heat loss through the base 11 and cover 12 does take place, the temperature of the thermal plate 20 and of the wax 22 will eventually fall to the solidification temperature or temperature range of the wax. Up to this point, the heat loss through the base and cover can be expected to be generally uniform, although at a low rate of heat loss, and the temperature of the food 15 will progressively fall.

However, when the temperature of the wax 22 reaches the solidification temperature or temperature range, the latent heat contained in the liquefied wax 22 must be yielded up and therefore the temperature within the cavity 13 will stop falling or at least will fall at a substantially slower rate. The temperature has been found to remain generally constant at or fall very slowly past the solidification temperature or temperature range while the solidification progresses. Only when the wax 22 has substantially completely solidified will the temperature again begin to fall at a significantly greater rate below the solidification temperature, i.e. below the preferred lower limit of the solidification temperature range of about 75. This lower limit of the solidification temperature range of about 70° to 75° C. is preferred not only because such a temperature is suitable for serving hot food but also because at lower temperatures, food spoilage from activity of microorganisms becomes significantly more likely, while at about 70° C. and above, the food spoilage organisms are inactive.

It has been found that a suitable mass of hard paraffin wax with a solidification temperature of about 75° C. to 95° C. if heated to about 95° C. can hold a significant amount of stored heat, particularly stored in the latent heat of the liquefied wax. A significantly heavier mass of metal such as aluminium must be used to store equivalent heat. For example, about 100 gm of hard paraffin wax with solidification temperature of 75° C. to 95° C. if heated to 95° C. holds about the same heat as 800 gm aluminium. It has also been found that, compared to the temperature maintenance period of about forty minutes referred to above in relation to the description of use of an aluminium thermal plate, use of a significantly smaller mass of wax in the thermal plate heated to 95° C. can enable food to be maintained at or above 75° C. and served at about that temperature for comparable or greater periods of time after preparation. It is believed that the efficient storage of heat as latent heat in the liquefied wax, also the low heat conductivity of the wax leading to relatively slow yielding up of the heat, and also the low heat conductivity of the insert material, substantially improve the utility of the thermal plate and system according to the present invention.

There are considerable savings in weight of meals to be handled and transported using the system. The temperature to which the thermal plate is heated i.e. below 100° C., is substantially lower than is needed with metal, giving occupational health and safety advantages and environmental advantages by reducing the stress of weight and temperature on plate dispensers and lowering power consumption.

Although the insulated food storage system particularly described and illustrated shows an insulated base 11 and cover 12 defining a cavity 13 for a single thermal plate 20 and a single food plate 30, the system can equally be used for storing multiple meals. In particular, it is possible for the base to be relatively deep and define for example a drum shape into which a number of thermal plates 20 and food plates 30 can be placed. The cover can be in the form of an insulated lid for the insulating drum. In this embodiment, a thermal plate can be placed in the bottom of the base, and a food plate with food thereon can then be placed on top of the thermal plate, spacing means such as a spacing collar can be placed on the food plate around the general edge region thereof so as to enclose the food and provide a support for the next layer. The next layer comprises a second thermal plate, second food plate with food thereon and second annular spacer. This stacking can be continued to the top of the drum. This insulated food storage system can be used for example for external catering facilities which are preparing numbers of meals for an institution or the like at separate premises. In particular, a catering establishment can prepare large numbers of meals and store them using the system of the present invention and the meals can be transported in this system to the site of use.

It is to be understood that various alterations, modifications and/or additions may be made to the features of the possible and preferred embodiment(s) of the invention as herein described without departing from the scope of the invention as defined in the claims.

What is claimed is:

1. An insulated food storage system comprising a thermally insulating enclosure (10) comprising a heat insulating base (11) and a heat insulating cover (12), the base (11) and the cover (12) cooperating together so as to define a cavity (13), the system further including a heat storage insert (20) to fit within the cavity (13), characterized in that the heat storage insert (20) has a chamber (21) therein, a container (32, 33) located within the chamber (21) in the heat storage insert (20), and a liquefiable substance (22) located within the container (32, 33), the substance (22) having the property of being liquefiable by heating and of solidifying at a temperature or at temperatures within a predetermined temperature range, the temperature or temperatures being at or above food spoilage temperatures and at an acceptable temperature for consumption of hot food, the container (32, 33) being made of a dissimilar material to the composition of the liquefiable substance (22) to resist leaching or migration of the liquefiable substance therethrough, whereby food (15) located within the cavity (13) together with the heat storage insert (20) is maintained substantially at said temperature or at temperatures within said range as the liquefiable substance (22) which has been previously heated and liquefied cools and solidifies.

2. A system as claimed in claim 1 characterized in that the container (32, 33) is made of metal and the liquefiable substance (22) is a wax and the liquefiable substance fills the metal container.

3. A system as claimed in claim 2 characterized in that the metal container comprises a tray (32), the liquefiable substance (22) being received in solid phase with a close fit within the tray (32), and a metal lid (33) covering both the tray (32) and the liquefiable substance (22) therein, the metal lid (33) having peripheral edges (34) sealed to the peripheral edges of the tray.

4. A system as claimed in claim 3 characterized in that the liquefiable substance (22) is initially cast in a liquid state in a mould which is slightly larger in dimensions to the tray (32), the liquefiable substance (22) upon solidifying in the mould shrinking to a size so that, upon being removed from the mould in the solid state and being placed in the tray (32) the solidified substance forms a close fit within the tray (32).

5. A system as claimed in claim 1 characterized in that the substance (22) solidifies at a temperature less than 95° C.

6. A system as claimed in claim 5 characterized in that the substance (22) solidifies at a temperature or at temperatures within the range 65° C. to 95° C.

7. A system as claimed in claim 5 characterized in that the substance (22) solidifies at a temperature or at temperatures within the range 75° C. to 95° C.

8. A system as claimed in claim 5 characterized in that the substance (22) comprises a wax product.

9. A system as claimed in claim 8 characterized in that the wax product comprises a hard paraffin.

10. A system as claimed in claim 1 characterized in that the insert (20) is in the form of and has the function of a thermal plate, the container (32, 33) within the chamber (21) and containing the liquefiable substance (22) being located at the center of the surface area of the thermal plate, the thermal plate (20) including an edge region (23) which does not contain the liquefiable substance (22) enabling the edge region (23) to be manually handled without insulating gloves being worn.

11. A system as claimed in claim 10 characterized in that the edge region (23) is an annular region around the periphery of the thermal plate (20).

12. A system as claimed in claim 10 characterized in that the edge region (23) comprises a hollow region.

13. A system as claimed in claim 10 characterized in that the thermal plate (20) comprises an upper face (23) and a lower face (26) which are spaced apart and further comprises a partition (27) defining a perimeter of the chamber (21) within which the container (32, 33) is contained.

14. A system as claimed in claim 13 characterized in that the thermal plate (20) is in the general form of a circular disc, the upper and lower faces (25, 26) being joined together at the edges of the disc, the partition (27) being located around the general center of the circular disc and spaced inwardly from the peripheral edges (28) of the circular disc so as to define a circular chamber (21) containing the container (32, 33) at the general central region of the circular disc and an annular edge region (23) where the upper and lower faces (25, 26) are spaced apart, none of the liquefiable substance (22) being contained in the edge region (23).

15. A system as claimed in claim 10 characterized in that the thermal plate (20) is generally complementary in shape to the under surface of a food plate (30) so that the food plate rests on the thermal plate (20), the chamber containing the container (32, 33) being generally equal in area to the area of the central part of the food plate (30) on which food (15) is in use placed and located directly beneath the central area of the food plate.

16. A system as claimed in claim 1 characterized in that the heat insulating base (11) is in the general form of a drum into which a number of heat storage inserts (20) can be stacked, the heat insulating cover (12) comprising a lid for the drum, whereby the enclosure (10) formed by the drum and the lid can contain a stack sequentially composed of a heat storage insert (20), a food plate (30) having food (15) thereon, and a spacer for supporting a superimposed heat storage insert without contacting food (15) on the food plate (30), the stack further comprising a number of similar sequentially arranged inserts, food plates, and spacers throughout the height of the drum.

17. A system as claimed in claim 1 characterized in that the heat storage insert (20) is composed of a low heat conductivity plastics material so as to promote slow heat loss through the insert as the liquefiable substance (22) solidifies and consequently promote formation in the liquefiable substance (22) of a solid phase having a lower energy state than if rapidly solidified.

18. A system as claimed in claim 17 characterized in that the heat storage (20) insert is composed of polypropylene.

19. A heat storage insert for use in an insulated food storage system which comprises a thermally insulating enclosure (10) comprising a heat insulating base (11) and a heat insulating cover (12), the base (11) and the cover (12) cooperating together so as to define a cavity (13), the heat storage insert (20) being adapted to fit within the cavity (13), characterized in that the heat storage insert (20) has a chamber (21) therein, a container (32, 33) located within the chamber (21) in the heat storage insert (20), and a liquefiable substance (22) located within the container (32, 33), the substance (22) having the property of being liquefiable by heating and of solidifying at a temperature or at temperatures within a predetermined temperature range, the temperature or temperature being at or above food spoilage temperatures and at an acceptable temperature for consumption of hot food, the container (32, 33) being made of a dissimilar material to the composition of the liquefiable substance (22) to resist leaching or migration of the liquefiable substance therethrough, whereby in use food (15) located within the cavity (13) together with the heat storage insert (20) is maintained substantially at said temperature or at temperatures within said range as the liquefiable substance (22) which has been previously heated and liquefied cools and solidifies.

20. An insert as claimed in claim 19 characterized in that the container (32, 33) is made of metal and the liquefiable substance (22) is a wax and the liquefiable substance fills the metal container.

21. An insert as claimed in claim 20 characterized in that the metal container comprises a tray (32), the liquefiable substance (22) being received in solid phase with a close fit within the tray (32), and a metal lid (33) covering both the tray (32) and the liquefiable substance (22) therein, the metal lid (33) having peripheral edges (34) sealed to the peripheral edges of the tray.

22. An insert as claimed in claim 19 characterized in that the insert (20) has a peripheral edge region (23) into which the container (32, 33) does not extend so that the edge region (23) does not contain the liquefiable substance (22) and can therefore be manually handled without insulating gloves being worn.

* * * * *